US 011772012B2

United States Patent
Shoykhet

(10) Patent No.: US 11,772,012 B2
(45) Date of Patent: Oct. 3, 2023

(54) COMBINED DEGASSING AND CIRCULATION OF LIQUID

(71) Applicant: Agilent Technologies, Inc., Santa Clara, CA (US)

(72) Inventor: Konstantin Shoykhet, Karlsruhe (DE)

(73) Assignee: Agilent Technologies, Inc., Santa Clara, CA (US)

( * ) Notice: Subject to any disclaimer, the term of this patent is extended or adjusted under 35 U.S.C. 154(b) by 120 days.

(21) Appl. No.: 16/780,366

(22) Filed: Feb. 3, 2020

(65) Prior Publication Data

US 2020/0246724 A1 Aug. 6, 2020

(30) Foreign Application Priority Data

Feb. 4, 2019 (GB) ..................................... 1901524

(51) Int. Cl.
*B01D 19/00* (2006.01)
*G01N 30/14* (2006.01)
*G01N 30/10* (2006.01)
*G01N 30/60* (2006.01)
*G01N 30/02* (2006.01)

(52) U.S. Cl.
CPC ......... *B01D 19/0031* (2013.01); *G01N 30/10* (2013.01); *G01N 30/14* (2013.01); *G01N 30/6091* (2013.01); *G01N 2030/027* (2013.01); *G01N 2030/146* (2013.01)

(58) Field of Classification Search
CPC ........... B01D 19/0031; B01D 19/0036; B01D 19/0063; G01N 30/10; G01N 30/14; G01N 30/6091; G01N 2030/027; G01N 2030/146; G01N 30/34; G01N 2030/22

USPC ............................................................. 96/6
See application file for complete search history.

(56) References Cited

U.S. PATENT DOCUMENTS 3,844,160 A * 10/1974 Yamaoka ........... G01N 33/2841
73/19.11
4,054,522 A 10/1977 Pinkerton
(Continued)

FOREIGN PATENT DOCUMENTS

CN 107449851 A 12/2017
EP 0489569 A2 6/1992
(Continued)

OTHER PUBLICATIONS

Chinese Office Action and Search Report dated Sep. 2, 2022 for application No. 202010078622.1; 9 pages.

*Primary Examiner* — Robert A Hopkins
*Assistant Examiner* — Qianping He

(57) ABSTRACT

A degasser for at least partially degassing a gas-containing liquid, in particular for a sample separation device, includes a circulation path along which the liquid can be circulated between a liquid accommodation volume and one of an inlet to a consumer unit consuming degassed liquid or a conduit leading to the inlet, a drive unit configured for circulating the liquid in the circulation path, and a filter in the circulation path for filtering particles or debris out of the liquid, wherein the liquid is forced through the filter by the drive unit. The drive unit includes a movable body, in particular a movable piston or a movable membrane, configured for at least partially degassing the liquid by generating a negative pressure in the liquid.

21 Claims, 2 Drawing Sheets

(56) References Cited

U.S. PATENT DOCUMENTS

| | | | | |
|---|---|---|---|---|
| 4,602,923 | A * | 7/1986 | Bernstein | F24D 19/083 |
| | | | | 96/172 |
| 5,976,226 | A * | 11/1999 | Bastian | H01F 27/14 |
| | | | | 174/12 R |
| 6,290,760 | B1 * | 9/2001 | Taivalkoski | B01D 19/0057 |
| | | | | 222/72 |
| 10,118,109 | B1 | 11/2018 | Dyer | |
| 2011/0214571 | A1 * | 9/2011 | Berndt | B01D 19/0031 |
| | | | | 96/6 |
| 2011/0220562 | A1 | 9/2011 | Beiriger | |
| 2013/0156646 | A1 * | 6/2013 | Bernhard | G01N 21/51 |
| | | | | 422/82.09 |
| 2014/0216250 | A1 * | 8/2014 | Meyer | A61M 1/16 |
| | | | | 95/22 |

FOREIGN PATENT DOCUMENTS

| | | | | |
|---|---|---|---|---|
| EP | 1577012 | A1 | 9/2005 | |
| FR | 2991395 | A1 * | 12/2013 | ......... F02M 37/0023 |
| WO | 2008080895 | A1 | 7/2008 | |
| WO | 2009021950 | A1 | 2/2009 | |
| WO | 2014134063 | A1 | 9/2014 | |
| WO | 2017184050 | A1 | 10/2017 | |

\* cited by examiner

COMBINED DEGASSING AND CIRCULATION OF LIQUID

FIELD OF THE INVENTION

The present invention relates to a degasser for and a method of at least partially degassing a gas-containing liquid, and a sample separation device.

TECHNOLOGICAL BACKGROUND

In liquid chromatography, a fluidic sample and an eluent (liquid mobile phase) may be pumped through conduits and a separation unit such as a column in which separation of sample components takes place. The column may comprise a material which is capable of separating different components of the fluidic sample. The separation unit may be connected to other fluidic members (like a sampler or an injector, a detector) by conduits. Before the fluidic sample is introduced into a separation path between a fluid drive unit (in particular a high pressure pump) and the separation unit, a predefined amount of fluidic sample shall be intaken from a sample source (such as a sample container) via an injection needle into a sample loop by a corresponding movement of a piston within a metering device. This usually occurs in the presence of a significantly smaller pressure than what the separation unit is run with. Thereafter, an injector valve is switched so as to introduce the intaken amount of fluidic sample from the sample loop of a metering path into the separation path between fluid drive unit and the separation unit for subsequent separation. As a result, the fluidic sample is injected into the mobile phase, such as a solvent or a solvent composition. It is important for a precise separation of the fluidic sample that the composition of the mobile phase is accurate. For precisely defining the composition and flow rate of the mobile phase and for achieving proper or even optimum detection sensitivity, liquid solvents used for creating the mobile phase can be degassed in a degasser before mixing.

However, the provision of a mobile phase without or with a low amount of gaseous components may be difficult.

SUMMARY OF THE INVENTION

There may be a need to at least partially degas a liquid in a simple and efficient way.

According to an exemplary embodiment of the present invention, a degasser for at least partially degassing a gas-containing liquid (in particular for a sample separation device) is provided, wherein the degasser comprises a circulation path along which the liquid can be circulated between a liquid accommodation volume and one of an inlet to a consumer unit consuming degassed liquid or a conduit leading to the inlet, a drive unit configured for circulating the liquid in the circulation path, and a filter in the circulation path for filtering particles or debris out of the liquid, wherein the liquid is forced through the filter by the drive unit, wherein the drive unit comprises a movable body (in particular a movable piston or a movable membrane) configured for at least partially degassing the liquid by generating a negative pressure in the liquid.

According to another exemplary embodiment, a sample separation device for separating a fluidic sample is provided, wherein the sample separation device comprises a pump for driving a mobile phase and the fluidic sample when injected in the mobile phase, a sample separation unit for separating the fluidic sample in the mobile phase, and a degasser having the above-mentioned features for at least partially degassing a gas-containing liquid, wherein the at least partially degassed liquid is supplied for creation of the mobile phase.

According to still another exemplary embodiment a method of at least partially degassing a gas-containing liquid (in particular in a sample separation device) is provided, wherein the method comprises circulating the liquid in a circulation path between a liquid accommodation volume on the one hand and an inlet to a consumer unit consuming degassed liquid or a conduit leading to an inlet to a consumer unit consuming degassed liquid on the other hand, at least partially degassing the gas-containing liquid by generating a negative pressure in the liquid, and filtering particles or debris out of the liquid by forcing the liquid through a filter in the circulation path.

In the context of the present application, the term "degasser" may particularly denote a device capable of and configured for at least partially removing gas (especially a dissolved gas) from a liquid. Thus, a degasser may at least partially separate gas from liquid of a liquid-gas composition. An output of the degasser may be a liquid having a smaller amount of gas than a liquid to be degassed and supplied to an input of the degasser.

In the context of the present application, the term "degassing unit" may particularly denote a specific portion or a member of a degasser which actually carries out the task of removing at least a part of gas from a gas-containing liquid. For this purpose, the degassing unit may process the gas-containing liquid in a specific way for separating a gaseous component from a liquid component thereof.

In the context of the present application, the term "drive unit" may particularly denote a device capable of and configured for driving a liquid along a fluidic path. For instance, such a drive unit may be a pump such as a piston pump.

In the context of the present application, the term "accommodation volume" may particularly denote a volume in which a (in particular gas-containing) liquid may be accommodated. For instance, such a liquid accommodation volume may be a volume within a container or a chamber.

In the context of the present application, the term "consumer unit" may particularly denote any device capable of and configured for consuming degassed liquid for fulfilling its function. For instance, such a consumer unit may be a pump which pumps the liquid to a destination, for instance to a chromatographic separation path. Thus, the degassed liquid may be consumed by the consumer unit for a certain purpose, for instance for the purpose of creating and pressurizing a mobile phase.

In the context of the present application, the term "circulating liquid" may particularly denote driving liquid in such a way that at least part of the liquid is continuously or periodically or sporadically guided along a circulation path. Such a circulation path may be a closed circulation path so that the circulating liquid may be moved in a way that it is transported a plurality of times along the same circulation path.

In the context of the present application, the term "movable body" may particularly denote a body being configured to be moved (in particular to be reciprocated) within a chamber or the like (for instance by a motor) so as to generate a vacuum or low-pressure within a gas-containing liquid, promoting a separation of the gas-containing liquid into a liquid-rich gas-poor component and another liquid-poor gas-rich component.

In the context of the present application, the term "sample separation device" may particularly denote a device capable of and configured for separating a fluidic sample into different fractions. For instance, sample separation may be accomplished using chromatography or electrophoresis.

In the context of the present application, the term "negative pressure" may particularly denote an absolute pressure lower than an atmospheric pressure (for instance lower than 1 bar) or environmental gas pressure. In particular, negative pressure may be denoted as pressure lower than the total of the partial pressure of the dissolved gases in the liquid to be degassed and the vapor pressure of the said liquid, more particularly equal to or lower than the vapor pressure of the said liquid at its temperature in the degassing unit.

According to an exemplary embodiment of the invention, a degasser is provided which is configured for efficiently degassing a gas-containing liquid. For this purpose, the gas-containing liquid is not only made subject to a specific degassing procedure, but is additionally circulated (preferably multiple times) between a liquid accommodation volume accommodating the gas-containing liquid to be degassed and a consumer unit (in particular one of an inlet to a consumer unit or a conduit leading to the inlet) which may consume at least partially degassed liquid. By combining the tasks of degassing and circulating, a degassing efficiency may be improved as a result of a repeated or continuous degassing of the circulating liquid. It has turned out that the combined degassing-circulating processing allows efficiently separating liquid from gas for supply to the consumer unit. As a further advantageous consequence of the mentioned circulation during degassing, a part of the at least partially degassed liquid can be consumed by the consumer unit, while another part of the degassed liquid may be returned to the liquid accommodation volume, for instance for repeated degassing. Thus, more liquid can be supplied to the consumer unit (for instance a high pressure chromatography pump) than actually needed by the consumer unit. In other words, the consumer unit may use a desired amount of the degassed liquid without being forced to be overfed with liquid which the consumer unit cannot process. In view of the excessive supply of degassed liquid to the consumer unit which the latter will only consume partially, there is also no risk that the consumer unit runs dry due to a lack of degassed liquid. According to an exemplary embodiment, a degassing procedure may also occur directly in a liquid accommodation volume and may be advantageously combined with a circulation towards a consumer unit, such as a pump of a liquid chromatography sample separation device. Advantageously, the degasser may comprise a filter in the circulation path. Such a filter may be a particle or debris filter for filtering particles or debris out of the liquid to be degassed and/or out of degassed liquid.

According to an exemplary embodiment of the invention, a degasser is provided which degasses a gas-containing liquid due to the motion of a movable body within the liquid to be degassed. For example, such a movable body may be a reciprocating body which brings the liquid to be degassed into motion and—in particular, also additionally or at the same time—promotes gas bubbles to be separated from the liquid phase. For instance, such a movable body may be a piston of a piston pump reciprocating while the liquid to be degassed is located in the piston chamber. Alternatively, it is also possible to arrange a movable membrane in a chamber accommodating the gas-containing liquid. By moving the membrane by an actuator (which may for instance be arranged on one side of the membrane opposing another side of the membrane at which the liquid to be degassed is arranged, wherein alternatively the actuator may also be placed in the liquid), a motion of the liquid may be initiated, which may support or have the tendency of separating gas bubbles from a liquid phase. A correspondingly at least partially degassed liquid may be supplied to a sample separation apparatus, for instance as a degassed mobile phase or mobile phase component for a chromatography sample separation apparatus. By taking this measure, a simple and reliable as well as efficiently operating degasser may be provided.

In the following, further embodiments of the degasser, the sample separation device, and the method will be explained.

In an embodiment, the drive unit may be configured for driving liquid via a flow path comprising a degassing unit (in particular a movable body thereof) and a flow path bifurcation, wherein one partial flow after the bifurcation is at least partially consumed by the consumer unit, and the other partial flow is returned to the liquid storage or liquid accommodation volume.

In an embodiment, the consumer unit may be located vertically higher (i.e. at higher level or location) than the liquid accommodation volume or solvent reservoir. When this condition is fulfilled, a gas saturated liquid may thermodynamically tend to outgas at any point with hydrostatic pressure below the atmospheric pressure. Therefore, the operation of the consumer unit may be additionally ensured by supplying it with at least partly degassed liquid and/or by pumping rather than sucking/drawing the liquid from the accommodation volume to an elevated location.

In an embodiment, the degasser is configured so that vapor originating from the gas-containing liquid remains within the degasser. In other words, the vapor which may be generated during the degassing procedure, is not or only in insignificant amount removed or exhausted from the system, in particular is not or only in insignificant amount removed or exhausted from the degasser in the described embodiment, but may remain within the system. Keeping the vapor generated during degassing the gas-containing liquid within the fluidic system within the degasser and finally returning the evaporated matter back to the liquid has turned out as an efficient measure for preventing an undesired solvent composition change. A precise solvent composition of the mobile phase is highly advantageous for sample separation devices such as liquid chromatography apparatuses.

In an embodiment, the degassing unit is selected from a group consisting of an ultrasonic degassing unit, a vibration generating degassing unit, and a closed volume vacuum degassing unit. By ultrasonic sound, a gas-containing liquid may be triggered to outgas the gas contained therein. Also by generating vibrations, a gas-containing liquid may be forced to separate gas from liquid. Degassing may also be carried out by other mechanisms, such as a gas-liquid separation membrane.

In particular, a degasser can be operated with ultrasound. For instance, an ultrasound actuator may be arranged in the liquid to be degassed (for instance in a liquid container) for degassing the liquid in the container. Also a circulation of the liquid may be accomplished by the ultrasound actuator carrying out also the degassing task.

As an alternative, degassing may also be carried out by generating a vacuum. In such an embodiment, a pump or syringe may draw liquid from a liquid container. When the liquid enters a cylinder of the pump or syringe it can be degassed by the action of the formed vacuum. The same pump or syringe and/or another pump may then convey the degassed liquid to a consumer unit. The gas and some of the liquid may be pumped back into the liquid accommodation volume, for instance of a container or reservoir.

In an embodiment, the degasser comprises a liquid container in which the degassing unit and the liquid accommodating volume are located. In other words, the degassing procedure may be carried out directly in a liquid container such as a solvent bottle in which a gas-containing liquid is stored. Therefore, the liquid drawn or pumped out of such a liquid container may already be sufficiently degassed. A corresponding degasser has the advantage of a compact construction.

In an embodiment, the degasser comprises an acoustic flow generator, in particular an acoustic flow generating nozzle, for generating a directed liquid flow in the liquid accommodation volume. Such a nozzle which is capable of generating a flow supported by an acoustic vibration may be specifically arranged in the portion of the gas-containing liquid which is presently degassed. The fresh degassed liquid can then be circulated towards the consumer unit (and back from the consumer unit to the liquid accommodation volume).

In an embodiment, the degasser comprises a system of conduits defining a circulation path along which the liquid can be circulated between the liquid accommodation volume and the consumer unit. For instance, a closed loop circulation path may be formed for continuously driving liquid between liquid accommodation volume and a consumer unit. Such a circulation path may be formed by one or multiple conduits (such as tubing or capillaries) which may be connected directly to one another and/or which may be connected indirectly via liquid into which open ends of the conduits may be immersed.

In an embodiment, an inlet and an outlet of a circulation path in the liquid accommodation volume are located substantially at the same height level. When care is taken that there is no substantial vertical height difference between inlet and outlet of the circulation path, a stable and continuous degassing procedure can be carried out.

In an embodiment, the filter in the circulation path may be a particle or debris filter for filtering particles or debris out of the liquid to be degassed and/or out of degassed liquid. For instance, such a filter may be located between the liquid accommodating volume and the drive unit, or after the drive unit (e.g. between the drive unit and the consumer unit or/and in the return path from the drive unit to the accommodation volume). By taking this measure, circulating the degassed liquid may be carried out simultaneously with a filtering procedure or filtering the solvent. A pure and gas depleted liquid can therefore be provided. When using such a filter during a continuous degassing and circulation procedure, the liquid will become cleaner and cleaner as a result of the continuous filtering.

In an embodiment, the degasser comprises the circulation path along which the liquid can be circulated from the liquid accommodation volume, in particular via a chamber, to the inlet of the consumer unit and back from the inlet of the consumer unit to the liquid accommodation volume, in particular without passing the consumer unit. Thus, the circulation path may be a closed circulation path which circulates the liquid along conduits which do not extend through the consumer unit. As a result, the circulation path may be spatially limited, thereby allowing to obtain a compact degasser.

In an embodiment, the circulation path may exclude the consumer unit. When the consumer unit forms part of a sample separation device, for instance is embodied as a pump of a sample separation device, the liquid circulated by the degasser and thus within the circulation path does not reach up to a sample separation path (in particular a path including a sample separation unit such as a chromatographic column).

In an embodiment, the circulation path along which the liquid can be circulated between the liquid accommodation volume and the inlet of the consumer unit does not extend through the consumer unit. In other words, while degassed liquid may flow partially through the consumer unit, the circulation path may be arranged completely outside of or apart from the consumer unit.

In an embodiment, the degasser is configured for splitting the at least partially degassed liquid at a splitting point upstream of or at the inlet of the consumer unit to thereby form a first partial flow of the at least partially degassed liquid out of the degasser and into the consumer unit and a second partial flow of the at least partially degassed liquid back to the liquid accommodation volume. Conduits relating to the first partial flow may carry degassed liquid consumed by the consumer unit (for instance used by a high-pressure pump of the sample separation device as a mobile phase for sample separation). Conduits relating to the second partial flow may relate to the above mentioned circulation path and may carry degassed liquid along the circulation path back to the liquid accommodation volume. When the consumer unit is a pump (in particular a mobile phase pump of a sample separation device), the first partial flow may be (at least along a part of its path) a low pressure flow and the second partial flow may be a high-pressure flow (i.e. a flow having a higher pressure than the first partial flow) pressurized by the consumer unit.

In an embodiment, the degasser comprises a liquid container provided separately from, in particular at a lower height level than, the liquid accommodating volume, wherein the drive unit of the degasser is configured for circulating liquid between the consumer unit, the liquid container and the liquid accommodation volume. In particular, the degasser may comprise a chamber delimiting the liquid accommodation volume in which the actual degassing procedure can be carried out. According to such an embodiment, a degassing chamber and a liquid storage may be spatially separated, i.e. may be formed as two different fluidically connected fluid-containing chambers. In such an embodiment, the circulation path may encompass the liquid container, the consumer unit and the additional chamber.

In an embodiment, the degasser comprises at least one of an inlet restrictor in a flow path from the liquid container to the chamber, and an outlet restrictor in a flow path from the chamber to the liquid container. Thus, both an inlet and an outlet of the chamber may be connected with a fluidic periphery by a respective restrictor. Supply of fluid to the chamber and draining of fluid from the chamber may therefore be limited by the respective restrictor, and a vacuum generated within the chamber (for instance in terms of degassing) will not be deteriorated by an excessive fluidic coupling with the fluidic periphery.

In an embodiment, at least one of the inlet restrictor and the outlet restrictor is selected from a group consisting of a passive restrictor, and an expansion nozzle. For instance, a passive restrictor may be a bottleneck or narrowed/tapered portion of a conduit, i.e. a spatially confined or locally narrowed section of a conduit. An expansion nozzle is another embodiment of a restrictor which can be implemented as well. In a further alternative, it is also possible to implement a spring-loaded check valve as flow restrictor.

In an embodiment, the degassing unit comprises the movable member, such as a reciprocating member, for degassing the gas-containing liquid by a motion, in particular a reciprocation, in a chamber. Such a reciprocating member may be a body such as a piston which is configured for reciprocating within the chamber, i.e. move forwardly and backwardly. The reciprocation motion of such a piston may also contribute to the degassing, since it may generate a vacuum and may promote phase separation of a gas-containing liquid. At the same time, the reciprocation may also contribute to driving the liquid in the chamber and optionally also outside of the chamber.

In an embodiment, the reciprocating member forms part of the drive unit. In such an embodiment, the reciprocation unit may fulfil two functions synergetically and simultaneously, i.e. driving gas-containing liquid (in particular along at least a part of a circulation path) and degassing the latter.

In an embodiment, the degasser has a gap between the reciprocating member and the body or wall of a chamber for supplying liquid to the chamber via the gap. Via such a gap between a piston chamber and a piston (which can be an embodiment of the reciprocating member) of a piston pump, gas-containing liquid may be supplied into the chamber delimiting the reciprocating member. A separate inlet may therefore be dispensable. The gap provides a restriction for the liquid flowing into the chamber, such that under-pressure or vacuum can be temporarily generated by piston movement.

In an embodiment, the reciprocating member in the chamber is configured as one of the group consisting of a piston pump and a syringe pump. However, other embodiments of the reciprocating member are possible as well, for instance a movable membrane of a membrane pump.

In an embodiment, the circulation path, within which the liquid is circulated, is split between the degassing unit (for instance a chamber thereof) or the drive unit on the one hand and the consumer unit and the liquid container on the other hand. For example, the circulation path may include a split point at which liquid flow from the liquid accommodation volume to the split point is split into respective liquid flows from the split point to the consumer unit and from the split point to the liquid container. Splitting the circulation path in the described way may allow conveying a gas-poor partially degassed liquid to the consumer unit and simultaneously conveying a gas-rich liquid poor medium back to the liquid container.

In an embodiment, an outlet of the chamber connected with the liquid container extends from a top side of the chamber. Correspondingly, another outlet of the chamber connected with the consumer unit may extend from a bottom side of the chamber. Such a positioning has turned out as highly efficient, since the force of gravity tends to accumulate liquid at the bottom side of the chamber while a gas bubble may rise up to the top side of the chamber.

In an embodiment, the circulation path, within which the liquid is circulated, provides an inlet of liquid supplied from the liquid container to the chamber via an inlet at a lower side of the chamber. Also this design rule has turned out as advantageously for the function of the degasser.

In an embodiment, the degasser comprises a gas separator at a split point where the circulation path is split. Such a gas separator may be configured for providing degassed liquid to the consumer unit and separated gas to the liquid container. An additional gas-liquid separation by such a gas separator may also contribute to the efficient degassing of the gas-containing liquid.

In an embodiment, the consumer unit is configured for consuming only part of the supplied degassed liquid. Correspondingly, the drive unit may be configured for circulating another part of the supplied degassed liquid, which is not consumed by the consumer unit, back to the liquid accommodation volume. Such an architecture advantageously prevents both overfeeding and underfeeding of the consumer unit with degassed liquid. The consumer unit may always be provided with a sufficient amount of degassed liquid and may consume a portion which matches with the corresponding operation mode of the consumer unit. Not required degassed liquid may be however circulated back. Such an architecture may also render a precise metering of the degassed liquid supplied to the consumer unit dispensable.

In an embodiment, at least part of the drive unit of the degasser forms at least part of the pump of the sample separation device. By taking this measure, the drive unit for circulating the gas-containing liquid and the pump for driving mobile phase and/or fluidic sample may be synergetically combined. A corresponding sample separation device with degasser can thus be manufactured in a compact way.

In an embodiment, at least part of the consumer unit forms at least part of the pump. Hence, the degassed liquid can be used by the pump for instance for providing a solvent or solvent composition to a sample separation path, for instance as a mobile phase for a chromatographic separation run. Thus, the degassed liquid can be used or consumed for providing a mobile phase. Since such a consumer unit also pumps the liquid, it can be used synergistically for driving gas-containing liquid and/or degassed liquid in the degasser Embodiments of the above described degasser may be implemented in conventionally available HPLC systems, such as the Agilent 1200 (or 1290) Series Rapid Resolution LC system or the Agilent 1150 HPLC series (both provided by the applicant Agilent Technologies—see the website www.agilent.com—which shall be incorporated herein by reference).

One embodiment of a sample separation device comprises a pump having a pump piston for reciprocation in a pump working chamber to compress liquid in the pump working chamber to a high pressure at which compressibility of the liquid becomes noticeable. This pump may be configured to know (by means of operator's input, notification from another module of the instrument or similar) or elsewise derive solvent properties.

The separation unit of the sample separation device preferably comprises a chromatographic column (see for instance the website location en.wikipedia.org/wiki/Column chromatography) providing a stationary phase. The column may be a glass or steel tube (for instance with a diameter from 50 µm to 5 mm and a length of 1 cm to 1 m) or a microfluidic column (as disclosed for instance in European Patent Application EP 1577012 A1, which is incorporated by reference herein in its entirety, or the Agilent 1200 Series HPLC-Chip/MS System provided by the applicant Agilent Technologies). The individual components are retained by the stationary phase differently and at least partly separate from each other while they are propagating at different speeds through the column with the eluent. At the end of the column they elute one at a time or at least not entirely simultaneously. During the entire chromatography process the eluent may be also collected in a series of fractions. The stationary phase or adsorbent in column chromatography usually is a solid material. The most common stationary phase for column chromatography is silica gel, surface modified silica gel, followed by alumina. Cellulose powder has often been used in the past. Also possible are ion exchange chromatography, reversed-phase chromatography (RP), affinity chromatography or expanded bed adsorption (EBA). The stationary phases are usually finely ground powders or gels and/or are microporous for an increased surface.

The mobile phase (or eluent), which can be created based on the degassed liquid, can be a pure solvent or a mixture of different solvents (such as water and an organic solvent such as ACN, acetonitrile). It can be chosen for instance to adjust the retention of the compounds of interest and/or the amount of mobile phase to run the chromatography. The mobile phase can also be chosen so that the different compounds or fractions of the fluidic sample can be separated effectively. The mobile phase may comprise an organic solvent like for instance methanol or acetonitrile, often diluted with water. For gradient operation water and organic solvent are delivered in separate bottles, from which the gradient pump delivers a programmed blend to the system. Other commonly used solvents may be isopropanol, tetrahydrofuran (THF), hexane, ethanol and/or any combination thereof or any combination of these with aforementioned solvents.

The fluidic sample may comprise but is not limited to any type of process liquid, natural sample like juice, body fluids like plasma or it may be the result of a reaction like from a fermentation broth.

The pressure, as generated by the pump, in the mobile phase may range from 2-200 MPa (20 to 2000 bar), in particular 10-150 MPa (150 to 1500 bar), and more particularly 50-120 MPa (500 to 1200 bar).

The sample separation device, for instance an HPLC system, may further comprise a detector for detecting separated compounds of the fluidic sample, a fractionating unit for outputting separated compounds of the fluidic sample, or any combination thereof. Further details of such an HPLC system are disclosed with respect to the Agilent 1200 Series Rapid Resolution LC system or the Agilent 1150 HPLC series, both provided by the applicant Agilent Technologies, under the website www.agilent.com, which shall be incorporated herein by reference.

Embodiments of the invention can be partly or entirely embodied or supported by one or more suitable software programs, which can be stored on or otherwise provided by any kind of data carrier (e.g., a machine-readable, non-transitory medium), and which might be executed in or by any suitable data processing unit. Software programs or routines can be preferably applied in or by the control unit.

BRIEF DESCRIPTION OF DRAWINGS

Other objects and many of the attendant advantages of embodiments of the present invention will be readily appreciated and become better understood by reference to the following more detailed description of embodiments in connection with the accompanying drawings. Features that are substantially or functionally equal or similar will be referred to by the same reference signs.

Figure 1:
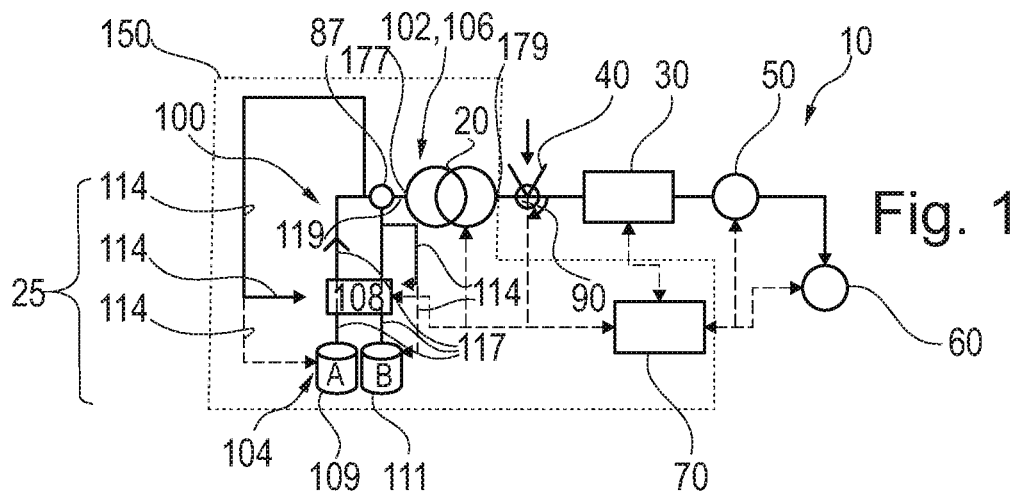
FIG. 1 shows a liquid sample separation device in accordance with embodiments of the present invention, particularly used in high performance liquid chromatography (HPLC).

The illustration in the drawing is schematic.

DETAILED DESCRIPTION

Before describing the figures in further detail, some basic considerations of the present invention will be summarized based on which exemplary embodiments have been developed.

According to an exemplary embodiment of the invention, a degasser for degassing a gas containing liquid is provided which boosts the degassing function by combining degassing with a circulation of the liquid. Such a degasser may be implemented particularly advantageously in a sample separation device such as a liquid chromatography device, more particularly an HPLC (high performance liquid chromatography) device.

According to another exemplary embodiment of the invention (which can be combined with or provided separately from the exemplary embodiment described in the previous paragraph), a degasser for degassing a gas-containing liquid is provided which uses a vacuum generating function of a movable body (such as a reciprocating piston) for degassing a gas-containing liquid. With such an architecture, the tasks of conveying the liquid and degassing the liquid may both be fulfilled simultaneously by the movable body. Also such a degasser may be implemented particularly advantageously in a sample separation device such as a liquid chromatography device, more particularly an HPLC (high performance liquid chromatography) device.

Solvent degassing may be highly desired in HPLC technology due to a number of reasons including flow stability. However, known degassing technologies have certain deficits. For instance, such deficits may be caused by insufficient selectivity of membranes used for degassing. Another shortcoming of conventional degassers is solvent vapor removal from the solvent reservoir, which may lead to an undesired solvent composition change. A discontinuous degassing process may also be undesired. Possible re-saturation of the solvents with gas in bottles or through partly gas permeable liquid transport tubing (in case of long residence time of the solvent in the tubing) may also be disturbing when using conventional degassers.

It may be advantageous to actively or forcedly transport a degassed solvent to the consumer unit (such as a pump inlet) if the consumer unit is situated above the solvent reservoir, because in this case a gas-saturated solvent may thermodynamically tend to outgas at any point with hydrostatic pressure below the atmospheric pressure. Thus, a degassing technology capable of providing a degassed solvent to a consumer unit with low effort may be desirable. Moreover, it would be beneficial to accomplish degassing without affecting the solvent composition by the degassing process.

According to an exemplary embodiment of the invention, a degasser may be provided which involves a circulation of a degassed solvent to a consumer unit (such as a pump inlet). This may be synergistically combined with the implementation of a degassing architecture which does not remove the solvent vapor from the system. For instance, this may be achieved based on cavitation in the liquid to be degassed and letting the outgassed bubbles to swim up and leave the liquid, whereas the solvent vapor condenses again and is kept back in the liquid. Exemplary degassing technologies which may be implemented in this context are ultrasonic degassing and closed volume vacuum degassing. These technologies can easily be joined with solvent circulation, thus maintaining the solvent in a degassed state in a solvent reservoir (for instance a bottle) continuously and providing the degassed solvent to the consumer unit (such as a pump).

Referring now in greater detail to the drawings, FIG. 1 depicts a general schematic of a liquid separation system as example for a sample separation device 10 according to an exemplary embodiment of the invention. A pump 20 receives a mobile phase from a solvent supply 25 via degassing unit 108 of a degasser 100, which degases and thus reduces the amount of dissolved gases in the mobile phase. Thus, the pump 20 consumes degassed liquid. Exemplary embodiments of the degasser 100 are shown in FIG. 2 to FIG. 5 and will be described below in further detail. The mobile phase pump 20 drives the mobile phase through a separation unit 30 (such as a chromatographic column) comprising a stationary phase. A sampler or injector 40, implementing a fluidic valve 90, can be provided between the pump 20 and the separation unit 30 in order to subject or add (often referred to as sample introduction) a sample fluid into the mobile phase so that a mixture of fluidic sample and mobile phase may be provided towards a separation path where actual sample separation occurs. The stationary phase of the separation unit 30 is configured for separating compounds of the sample liquid. A detector 50 is provided for detecting separated compounds of the sample fluid. A fractionating unit 60 can be provided for outputting separated compounds of sample fluid.

While the mobile phase can be comprised of one solvent only, it may also be mixed from plural solvents. Such mixing might be a low pressure mixing and provided upstream of the pump 20, so that the pump 20 already receives and pumps the mixed solvents as the mobile phase. Alternatively, the pump 20 may comprise plural individual pumping units, with plural of the pumping units each receiving and pumping a different solvent or mixture, so that the mixing of the mobile phase (as received by the separation unit 30) occurs at high pressure and downstream of the pump 20 (or as part thereof). The composition of the mobile phase may be kept constant over time, the so called isocratic mode, or varied over time, the so called gradient mode.

A data processing unit or control unit 70, which can be a PC or workstation, may be coupled (as indicated by the dotted arrows) to one or more of the devices in the sample separation device 10 in order to receive information and/or control operation. For example, the control unit 70 may control operation of the pump 20 (for example setting control parameters) and receive therefrom information regarding the actual working conditions (such as output pressure, etc. at an outlet of the pump 20). The control unit 70 may also control operation of the solvent supply 25 (for example setting the solvent/s or solvent mixture to be supplied) and/or the degasser 100 (for example setting control parameters and/or transmitting control commands to any of the components shown in FIG. 2 to FIG. 5) and may receive therefrom information regarding the actual working conditions (such as solvent composition supplied over time, vacuum level, etc.). The control unit 70 may further control operation of the sampling unit or injector 40 (for example controlling sample injection or synchronization sample injection with operating conditions of the pump 20). The separation unit 30 may also be controlled by the control unit 70 (for example selecting a specific flow path or column, setting operation temperature, etc.), and send—in return— information (for example operating conditions) to the control unit 70. Accordingly, the detector 50 may be controlled by the control unit 70 (for example with respect to spectral or wavelength settings, setting time constants, start/stop data acquisition), and send information (for example about the detected sample compounds) to the control unit 70. The control unit 70 may also control operation of the fractionating unit 60 (for example in conjunction with data received from the detector 50), which may provide data back.

FIG. 1 also shows a liquid supply device 150 configured for metering liquids in controlled proportions and for supplying a resultant mixture as mobile phase. The liquid supply device 150 comprises in the shown example two reservoirs 109, 111 each containing a respective solvent component A (in this example water), B (in this example a buffer, i.e. salt dissolved in a solvent). Moreover, it is possible to provide one or more additional reservoirs, for instance an additional reservoir comprising an organic solvent, a further reservoir comprising an optional organic modifier, etc. Each of the reservoirs 109, 111 is fluidically connected via a respective liquid supply line 117 and via the degassing unit 108 with a proportioning unit 87 which may be configured as proportioning valve. The proportioning unit 87 is configured to connect a selected one of the liquid supply lines 117 with a supply line or conduit 119 guiding towards the pump 20, and to switch between different liquid supply lines 117. The supply line or conduit 119 is connected with an inlet 177 of the pump 20. Hence, solvent blending is performed at the low-pressure side of the pump 20 by metering or proportioning a sequence of fluidic portions.

As illustrated schematically in FIG. 1, a circulation path 114 may be formed for circulating liquid between the reservoirs 109, 111 and the degassing unit 108 on the one hand, and short conduit 119 (to which proportioning unit 87 is connected) leading to inlet 177 of liquid consuming pump 20 (wherein the circulation path 114 may also encompass one or both of the reservoirs 109, 111) on the other hand. For instance, the pump 20 for driving mobile phase and a possible drive unit for circulating gas-containing and degassed liquid within the degasser 100 can be synergetically combined or can cooperate. By the shown architecture, it can be ensured that the mobile phase driven by the pump 20 and supplied at outlet 179 comprises only a minor amount of gas (if at all) and can carry a fluidic sample to be separated in sample separation unit 30 without the risk of gas inclusions (such as air bubbles) and with a precisely definable composition. For example, pump 20 may function as drive unit 102 for driving liquid and may function as consumer unit 106 consuming part of the liquid. Reservoirs 109, 111 may accommodate liquid and may thus form a liquid accommodation volume 104.

Although not shown in FIG. 1, a filter 116 (see FIG. 2, FIG. 3 or FIG. 5) may be arranged in the circulation path 114 for filtering particles or debris out of the liquid. The liquid may be forced through such a filter 116 by the drive unit 102. The drive unit 102 may comprise a movable body (see for example reference sign 124 in FIG. 3), such as a movable piston or a movable membrane. Such a movable body may be configured for at least partially degassing the liquid by generating a negative pressure in the liquid. Such elements (filter, movable body) may be provided in all embodiments, although not shown in each and every figure.

Figure 2:
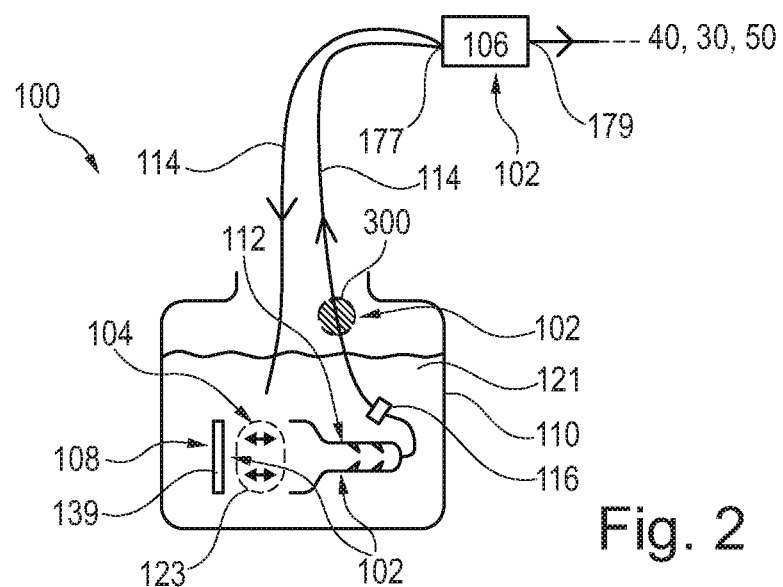
FIG. 2 shows a degasser according to an exemplary embodiment of the invention.

FIG. 2 to FIG. 5, which will be described in the following in detail, show exemplary embodiments for degasser 100:

FIG. 2 illustrates a degasser 100 according to an exemplary embodiment of the invention with a simple construction.

This degasser 100 is configured for degassing a gas-containing liquid 121 in a liquid container 110 (for instance one of reservoirs 109, 111 in FIG. 1). Degassed liquid can be supplied to a consumer unit 106, which can be a member of the sample separation device 10 consuming degassed liquid, in particular pump 20. From the consumer unit 106, the degassed and consumed liquid can be further processed in sample separation device 10 (as indicated schematically in FIG. 2 by reference numerals 40, 30, 50). Thus, the consumer unit 106 may be high pressure pump 20 of a liquid chromatography apparatus. In such an embodiment, the consumer unit 106 may further compress the degassed liquid and may convey or drive the degassed liquid as mobile phase towards injector 40, sample separation unit 30 and detector 50.

The illustrated degasser 100 comprises a schematically illustrated fluid drive unit 102 which can be embodied as one or a combination of several members of the degasser 100. For instance, consumer unit 106, which can be pump 20, can contribute to pumping the liquid 121 through the degasser 100. Also an optional pump 300 in the circulation path 114 may form at least part of the fluid drive unit 102 driving the liquid 121. Also degassing unit 108 when embodied as described referring to FIG. 2 can functionally form part of the fluid drive unit 102. The fluid drive unit 102 is configured for circulating the liquid 121 along the circulation path 114 between a liquid accommodation volume 104 in liquid container 110 on the one hand and an inlet 177 to the consumer unit 106 consuming degassed liquid on the other hand.

The degassing unit 108 is configured for degassing the gas-containing liquid 121. Such liquid 121 is located in the liquid accommodation volume 104 and thus within the liquid container 110. As shown in FIG. 2, the degassing unit 108 is immersed in the gas-containing liquid 121. Preferably, any or at least most of vapor originating from the gas-containing liquid 121 in the course of the degassing process remains within the degasser 100 and does not leave the system.

In the illustrated embodiment, the degassing unit 108 comprises an ultrasonic actuator 139 for generating ultrasound in a cavitation zone 123. The degassing unit 108 according to FIG. 2 also comprises an acoustic flow generating nozzle as acoustic flow generator 112 for generating a directed liquid flow in the liquid accommodation volume 104.

A closed circulation path 114 is formed by a number of cooperating conduits (for instance capillaries or tubing) with free ends being immersed in the liquid 121 and providing fluidic connections between liquid container 110 and consumer unit 106. Various arrows in the circulation path 114 in FIG. 2 (and FIG. 3 to FIG. 5) indicate a corresponding flow direction of the respective fluid. No significant pressure is needed for circulation if inlet and outlet of circulation path 114 are a) at the same height in the air, or b) if they are both immersed into the liquid in the same liquid container 110 (or in fluidically coupled liquid containers). In the case b) it does not matter how deep either of the tubes is immersed.

Furthermore, a filter 116 may be implemented at an appropriate position in the circulation path 114 between the liquid accommodation volume 104 and the consumer unit 106. For instance, filter 116 may be included in the circulation path 114 when a circulating pump capable of providing pressure, needed to force the liquid through the filter is implemented. Such pressure may be in the range of 0.01-5 bar, particularly 0.1-2 bar, more particularly 0.5-1 bar over ambient pressure. The filter 116 may however also be implemented between the pump inlet 177 and the circulation circuit.

The ultrasonic actuator 139 of the degassing unit 108 in the solvent bottle or liquid container 110 generates a cavitation zone (illustrated schematically in FIG. 2 with reference numeral 123), in which degassing occurs due to the impact of the ultrasound. For instance, the ultrasonic actuator 139 can be operated in a pulsed mode. The acoustic nozzle forming the acoustic flow generator 112 may be capable of generating a directed liquid flow of the oscillating liquid 121 and may be placed accordingly in the acoustic field. The generated flow may be used to feed the liquid to the consumer unit 106 and to circulate it back into the liquid container 110 via the closed circulation path 114, thus avoiding liquid stagnation in the tubing or conduits of the circulation path 114. In the shown embodiment, the ultrasonic actuator 139 acts as the degassing unit 108. The ultrasonic actuator 139 is placed in liquid container 110 for generating the ultrasonic sound directly in the liquid 121. This operation of the ultrasonic actuator 139 provides degassing of the gas-containing liquid 121 in the liquid accommodation volume 104, i.e. in the volume to be degassed. More specifically, the degassing effect develops strongly in the cavitation zone 123. The acoustic flow generator 112 generates an acoustic flow and may also contribute to circulate the degassed liquid towards the consumer unit 106 and back.

Part of the degassed liquid can be consumed by the consumer unit 106 for creating a mobile phase for sample separation device 10. However, another part of the degassed liquid pumped towards consumer unit 106 is not consumed by the consumer unit 106 but is circulated back from the consumer unit 106 by the drive unit 102 into an interior of the liquid container 110.

In the following, the working principle of the degasser 100 according to FIG. 2 will be described in further detail. The generated ultrasound results in a cavitation (see cavitation zone 123) of the liquid 121 to be degassed. This means that zones of underpressure and overpressure may be generated in the liquid 121 to be degassed. In the underpressure zones cavities and/or bubbles can arise, which may be filled with the gas dissolved in the liquid 121 to be degassed and vapor of the liquid 121. Though the most vapor condenses back at the latest when the bubbles leave the cavitation zone, gas-filled bubbles may remain and may swim upwardly in the liquid 121 to be degassed. A gas-depleted liquid 121 remains back in the container 110 and especially a gas-depleted portion of the liquid 121 can then be supplied via the acoustic flow generator 112 towards the consumer unit 106.

In one embodiment, the drive force for this liquid transport towards consumer unit 106 can be provided by the acoustic flow generator 112 and the ultrasonic actuator 139 only. Alternatively, optional additional pump 300 can be implemented in a conduit of the circulation path 114 connecting the liquid conduit inlet with the consumer unit 106. When pump 300 is present, nozzle or flow generator 112 may be dispensable. In yet another embodiment, the consumer unit 106 itself may also contribute to the circulation of the liquid 121, and may thus also form part of drive unit 102.

The consumer unit 106 takes a desired amount of degassed liquid supplied via the conduit connecting the acoustic flow generator 112 and the consumer unit 106. However, due to the provision of the circulation path 114, it can be highly advantageously ensured that there is always a supply of degassed liquid towards the consumer unit 106. It can however be ensured as well that no overfeeding of the consumer unit 106 occurs, since the circulation path 114 circulates back degassed liquid which is presently not needed or consumed by the consumer unit 106 into the liquid container 110. Thus, an actually sufficiently high amount of degassed liquid can be circulated along the consumer unit 106, such that it can at every time take the amount of degassed liquid needed for operation.

Still referring to FIG. 2, the liquid is circulated along circulation path 114 from the liquid accommodation volume 104 to the inlet 177 to the consumer unit 106 and back from the inlet 177 of the consumer unit 106 to the liquid accommodation volume 104 without passing entirely through the consumer unit 106. Thus, the circulation path 114 excludes the consumer unit 106 and does not extend through the consumer unit 106 from its inlet 177 up to its outlet 179. It is possible that the degasser 100 splits the at least partially degassed liquid 121 at a splitting point at the inlet 177 of the consumer unit 106 to thereby form a first partial flow of the at least partially degassed liquid 121 out of the degasser 100 and into the consumer unit 106 and from there through its outlet 179 towards a sample separation path. A second partial flow of the at least partially degassed liquid 121 flows from the splitting point back to the liquid accommodation volume 104.

Figure 3:
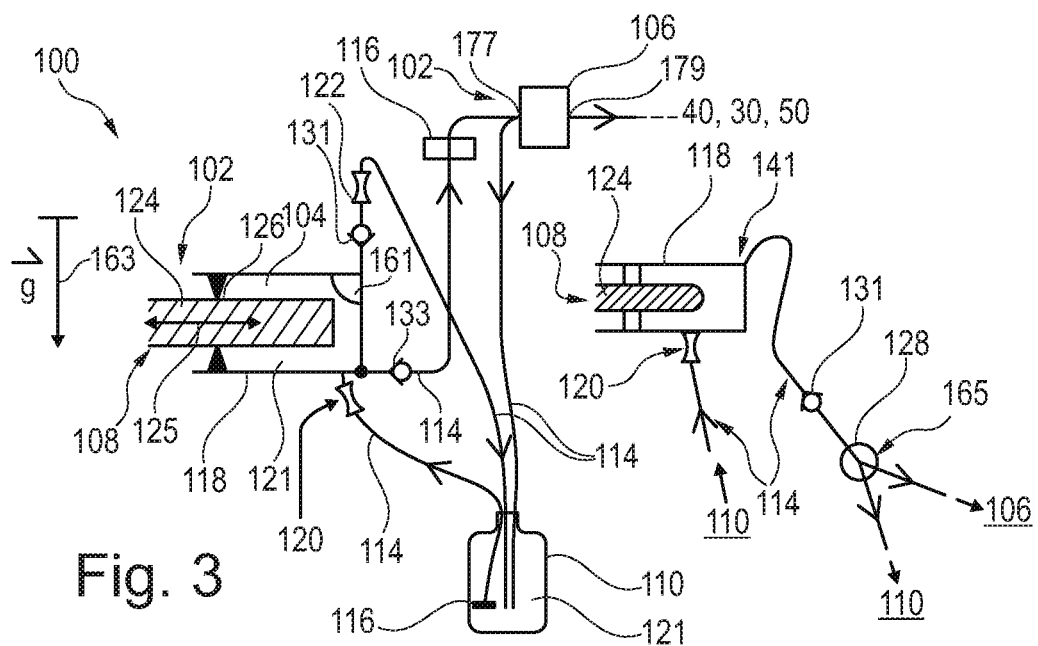
FIG. 3 shows a degasser according to another exemplary embodiment of the invention.
Figure 4:
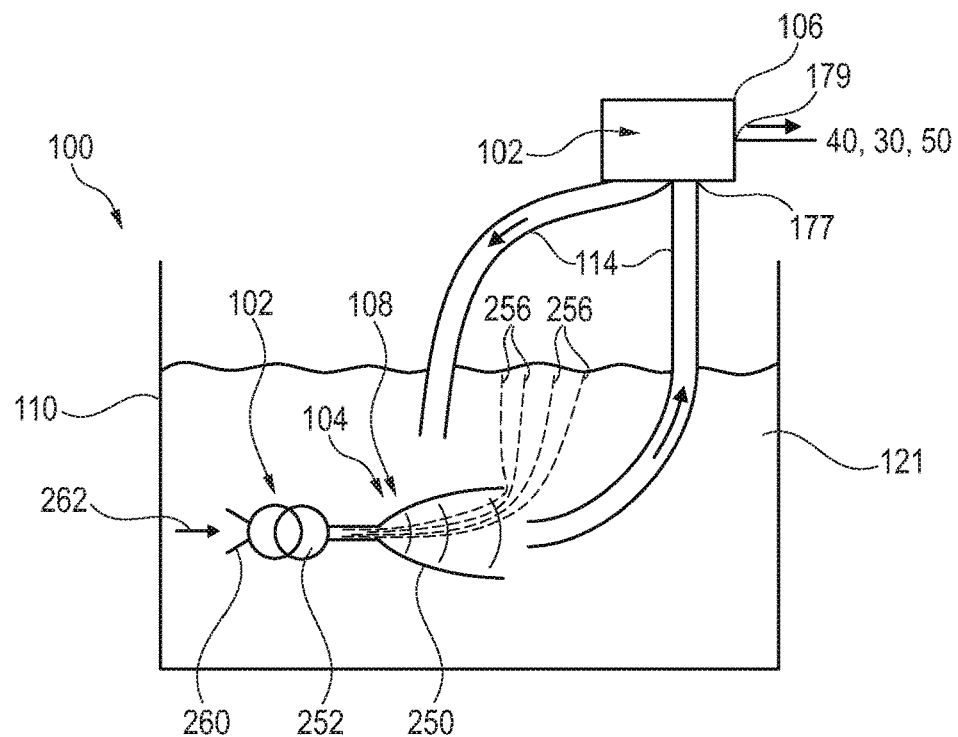
FIG. 4 shows a degasser according to still another exemplary embodiment of the invention.

FIG. 3 illustrates a degasser 100 according to another exemplary embodiment of the invention which enables a highly efficient degassing.

The degasser 100 according to FIG. 3 comprises a liquid container 110 which is provided separately from the liquid accommodation volume 104, which is now located within a separate chamber 118. In other words, the degasser 100 according to FIG. 3 comprises the separate chamber 118 defining or delimiting the liquid accommodation volume 104 and thus accommodating liquid 121 to be degassed. The degasser 100 according to FIG. 3 is configured for circulating liquid 121 between the consumer unit 106, the liquid container 110 and the chamber 118 containing the liquid accommodation volume 104 via circulation path 114.

Moreover, an inlet restrictor 120 is provided in a flow path from the liquid container 110 to the chamber 118. The circulation path 114 may hence provide an inlet of liquid 121 supplied from the liquid container 110 to the chamber 118 via the inlet restrictor 120. Furthermore, an outlet restrictor 122 may be implemented in a flow path from the chamber 118 to the liquid container 110. The inlet restrictor 120 and the outlet restrictor 122 may for example each be a passive restrictor or an expansion nozzle.

As indicated with a double arrow 125, the degassing unit 108 of FIG. 3 comprises a movable body 124 which is here embodied as a reciprocating body (such as a piston) reciprocating within chamber 118. The movable body 124 is capable of degassing gas-containing liquid 121 in liquid accommodation volume 104 by moving, preferably by reciprocating, within the chamber 118. For instance, the movable body 124 in the chamber 118 may form part of a piston pump or a syringe pump or a membrane pump. In different embodiments, the movable body 124 may or may not form part of the drive unit 102, i.e. may or may not contribute to drive the liquid 121 towards consumer unit 106.

Thus, a reciprocating pump (comprising the movable body 124 as movable pump body) may be used for degassing and solvent circulation. For enabling an efficient degassing, a significant restriction—in form of inlet restriction 120—may be included into the draw path of the reciprocating pump. The inlet restriction 120 can be a passive restrictor capable of generating a pressure drop of at least 1 bar at the applicable volumetric draw rate of the movable body 124, thus creating a condition, at which the fresh liquid is not able to follow the piston as it is retreating and thus at least temporarily generating gas and/or vapor bubbles in the degassing chamber 118. Alternatively, the mentioned inlet restriction 120 can be realized by an expansion nozzle initiating cavitation in the inlet region of the chamber 118 and providing an underpressure in the chamber 118. In yet another embodiment, it may be separate or combined with or driven by a piston valve, which may close at a certain piston position during the draw phase, such that enclosed liquid 121 is subjected to vacuum.

A function of the outlet path (including outlet restriction 122/check valve 131) may be to separate a liquid containing gas bubbles and to return it to the liquid container 110 such, that the bubbles can swim up and leave the liquid. The outlet restriction or restrictor 122 therefore serves to define a reasonable flow split ratio between the path related to reference numeral 177 and the path related to reference numeral 122, such that both, the air is transported away and the pump 20 is provided with fresh solvent. If there is no filter 116 in the path between reference numeral 133 and reference numeral 177, outlet restriction 122 may be dispensable, otherwise outlet restriction 122 may be useful for providing pressure for the filter 116. It is also possible to eliminate the path relating to inlet restriction 120 and to eliminate the check valve 131 and to use the path relating to outlet restriction 122 for both liquid intake and purging the gas-rich liquid, in particular when the line is short (i.e. of sufficiently low volume) or the chamber 118 is immersed into liquid 121 altogether (for instance when chamber 118 is placed within liquid container 110).

Optionally, a gap 126 may be formed or left open between the movable body 124 and the chamber 118, enabling a supply of liquid 121 to the chamber 118 via the gap 126 (for instance in an alternative embodiment in which the chamber 118 is immersed into liquid 121, for example is placed within liquid container 110). Thus, the liquid feed into the chamber 118 can be done via such a narrow gap 126 between the movable body 124 and the surrounding cylinder of the chamber 118. Making the pump cylinder assembly immersible into the solvent may eliminate a need for sealing or providing inlet restriction 120 and corresponding conduit.

Optionally but highly advantageously, a filter 116 may be implemented in the conduit of the circulation path 114 connecting chamber 118 with consumer unit 106 for filtering debris or the like out of the degassed liquid. Thus, the filter 116 at this position in the circulation path 114 continuously filters the liquid in the system shown in FIG. 3, so that the liquid becomes continuously cleaner. Additionally, the filter 116 may be supplied with high pressure as a consequence of the motion of the movable body 124 in the chamber 118. As a result of this significant pressure available for acting on the filter 116, the filter 116 may be manufactured with low pore sizes which additionally promotes an efficient filtering of the degassed liquid.

Advantageously, the degasser 100 according to FIG. 3 implements the movable body 124 in form of the movable (in particular reciprocating) piston being configured for degassing the liquid 121 by generation of a negative pressure in the liquid 121. The degasser 100 is further configured for supplying the at least partially degassed liquid 121 to a sample separation device 10, more precisely to the consumer unit 106 thereof. The latter may be the high-pressure pump 20 of the (for instance chromatographic) sample separation device 10.

The degassing chamber 118 can be a cylinder of a piston or syringe pump or it also may be a membrane pump chamber or the like. In the shown embodiment, the degassing chamber 118 has two outlets each with a corresponding one of check valves 131, 133. One of the outlets guides degassed liquid to consumer unit 106. The other outlet guides gas-rich liquid back to liquid container 110. In the shown embodiment, one of the outlets is situated in the upmost point in the chamber 118, and the other one elsewhere, preferably at a lower point in the chamber 118. Thus, the upper outlet may be located at a position where a gas bubble 161 generated as a result of the degassing of the liquid 121 will move to, as a result of gravity (compare g-vector 163). The upper outlet may open into chamber 118 for connection to liquid container 110. The lower outlet may connect chamber 118 to consumer unit 106.

Alternatively and as shown in a detail 141 of FIG. 3, it is possible to provide the chamber 118 only with a single outlet connected with a check valve 131. The flow path corresponding to this outlet may be split in two paths downstream of the chamber 118. As shown in detail 141 of FIG. 3, the circulation path 114, within which the liquid is circulated, may be split between the chamber 118 on the one hand and the consumer unit 106 and the liquid container 110 on the other hand. More precisely, the split flow path may extend from a top side of the chamber 118 (where a gas bubble 161 may be located). Furthermore, a gas separator 128 can be provided at a split point 165 of the circulation path 114 and can be configured for providing degassed liquid to the consumer unit 106. Moreover, the gas separator 128 may supply separated gas together with a partial flow of the liquid back to the liquid container 110. In this case a single outlet path is split in two, and gas separator 128 may be installed at the split point 165. Thus, a gas bubble 161 can swim up into the upper path. Still referring to the detail 141 of FIG. 3, it is advantageous that the conduit guiding the liquid to the gas separator 128 connects to the chamber 118 at an upper side of the chamber 118. The reason for this is that the force of gravitation has the tendency of accumulating the gas bubble 161 and the gas-rich liquid portion at the upper side of the chamber 118. It may be advantageous to construct the line from chamber 118 up to gas separator 128 short, to avoid or reduce the re-dissolution of the gas in the liquid. It may also be advantageous to keep the line from gas separator 128 up to consumer unit 106 short, in which case the gas separator 128 can at the same time act as a flow splitter, such that no additional return line from consumer unit 106 is needed.

During a draw procedure carried out by movable body 124, the solvent or liquid 121 may boil or cavitate and outgas in the chamber 118. In a subsequent displacement phase carried out by movable body 124 as well, a gas and/or vapor bubble 161 may first be compressed to atmospheric pressure, the vapor may condense and the extracted gas may swim up as bubble 161. Then, the liquid may be displaced in two paths: the degassed liquid may be displaced into the circulation path 114 towards the consumer unit 106. The gas bubble 161 may be displaced together with a portion of the liquid via a return path into the bottle or liquid container 110, where it may swim up and may leave the solvent.

Additionally, an ultrasonic, acoustic or vibration pulse can be applied to the chamber 118 while it is under vacuum or underpressure to further promote or stimulate cavitation or boiling of the liquid 121 and thus improve the outgassing.

During operation, the reciprocating member or movable body 124 reciprocates within its chamber 118. A seal may ensure a leakage-free reciprocation of the reciprocating member or movable body 124 within its chamber 118. One outlet from this chamber 118 is connected via check valve 131 and outlet restrictor 122 to the liquid container 110 which may be a solvent bottle. From the liquid container 110, gas-containing liquid 121 may be drawn via inlet restrictor 120 (or a cavitation nozzle or an active valve) into the chamber 118 in which the movable body 124 reciprocates.

Furthermore, the drive unit 102 (such as a pump-type consumer unit 106 and/or the fluid driving function of the movable body 124) recirculates degassed liquid to the liquid container 110 and is supplied for this purpose with liquid via a corresponding fluidic conduit connecting the chamber 118 with the consumer unit 106. The further check valve 133 is implemented in this conduit.

In the following, operation of the degasser 100 according to FIG. 3 will be described in further detail. Liquid 121 to be degassed is drawn from liquid container 110 via a conduit of circulation path 114 into the chamber 118. An optional check valve (not shown) may be implemented in the mentioned conduit for enabling flow of liquid 121 only in the described direction, and not in the opposite direction. Inlet restrictor 120 can for instance be configured as a narrow portion of the conduit and can contribute to the formation of a negative pressure within the chamber 118 as a consequence of a motion of the movable body 124 within the chamber 118 towards the left-hand side according to FIG. 3. In other words, the backward motion of the movable body 124 draws liquid 121 to be degassed from the liquid container 110 into the chamber 118. More specifically, a reciprocation of the movable body 124 in the chamber 118 may promote a separation of gas and liquid in the liquid 121 to be degassed, and may therefore function as degassing unit 108. Within the chamber 118, the reciprocating piston generates an underpressure which, in turn, results in a degassing due to a cavitation effect. As indicated with reference numeral 161 in FIG. 3, a gas bubble can therefore be generated in an upper region of the chamber 118 as a consequence of the force of gravitation (compare g-vector indicated with reference numeral 163). As a result of gravitation, and as a result of the described degassing, an at least partially degassed liquid can exit at a corresponding conduit of the circulation path 114 at the lower side of the chamber 118. Thus, the degassed liquid is supplied through the mentioned conduit to the consumer unit 106.

Via the above-mentioned conduit of the circulation path 114, the consumer unit 106 is provided with a sufficient amount of degassed liquid. For example, the consumer unit 106 may be a pump 20 of a liquid chromatography system which may use the degassed liquid as a mobile phase during a subsequent chromatographic separation (compare reference numerals 30, 40, 50 in FIG. 3). However, a part of the degassed liquid which is not consumed by the consumer unit 106 may be circulated back via another conduit of the circulation path 114 towards the liquid container 110. In other words, the consumer unit 106 has the possibility to use a desired amount of degassed liquid without being forced to consume more than required and without suffering from an insufficient amount of supplied degassed liquid. This can be ensured by guaranteeing that, at each time, a safely sufficient amount of degassed liquid is pumped towards the consumer unit 106 which partially uses the degassed liquid and partially returns the degassed liquid to the container 110 via the circulation path 114.

Like the embodiment of FIG. 2, the embodiment of FIG. 3 also allows for a continuous solvent degassing in the solvent reservoir or liquid container 110 and maintains solvent circulation to the consumer unit 106. As indicated above, it is possible to eliminate the flow path relating to inlet restriction 120 and check valve 131. It is also possible to then make the line relating to outlet restriction 122 a back-and-forth line. For this purpose, it may be advantageous to provide the corresponding line short enough, such that the return flow can expel bubbles out of the line.

However, many other exemplary embodiments of the invention are possible. According to one further embodiment of a degasser 100 shown in FIG. 4, the cavitation may be achieved in an expansion nozzle 250, preferably immersed in the solvent tank or liquid container 110. A circulation through the nozzle 250 may be maintained by a pump 252 (for instance by a high-flow low pressure pump or a high-flow medium pressure pump) aspirating gas-containing liquid 121 through a pump inlet 260 (see arrow 262). For example, such a pump 252 may be immersible in the liquid 121 or may be arranged external from the liquid 121 and the liquid container 110. In such an embodiment, the circulation to the consumer unit 106 may be achieved by placing an inlet funnel on the way of the jet leaving the nozzle 250 after the free flow gap provided for gas bubbles 256 generated by outgassing into the cavitation bubbles in the nozzle 250 to separate and swim-up.

According to an exemplary embodiment, a cyclone nozzle comprising a centrifugal gas separator and degassed liquid flow outlet for circulation may be implemented in combination with a high-flow circulation pump.

Figure 5:
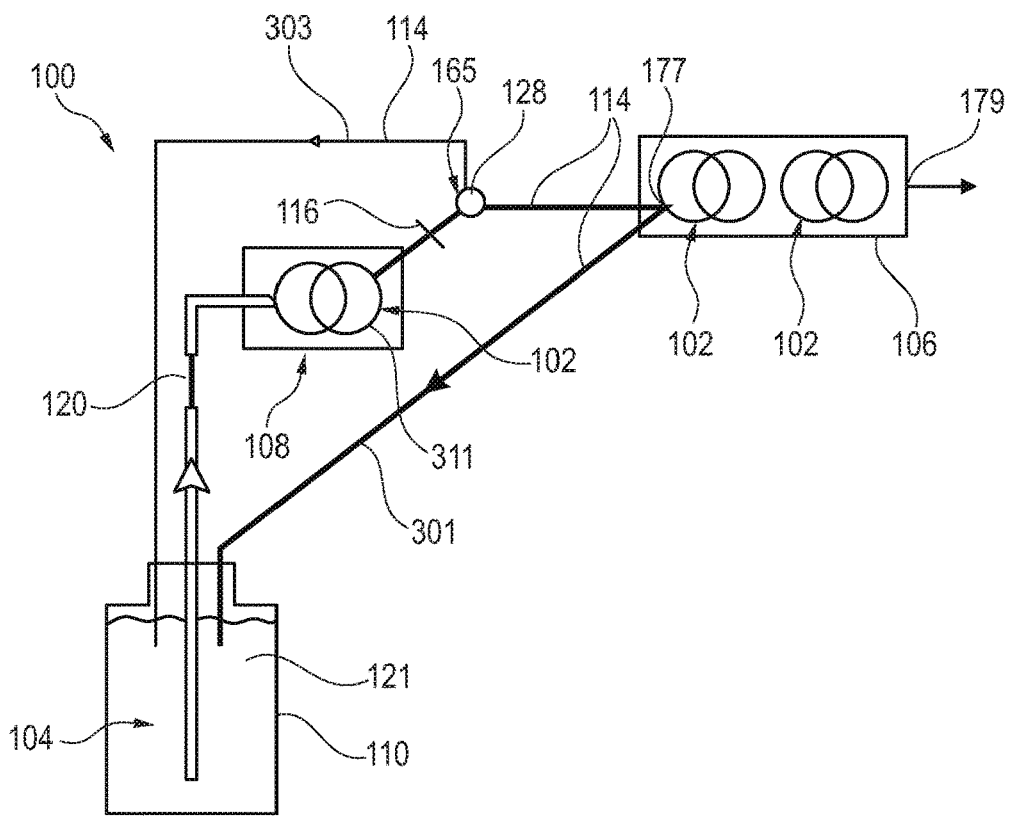
FIG. 5 shows a degasser according to yet another exemplary embodiment of the invention.

FIG. 5 shows a degasser 100 according to yet another exemplary embodiment of the invention.

FIG. 5 illustrates an embodiment that includes an aspirating pump 311 with an integrated or downstream connected gas separator 128. The embodiment of FIG. 5 may use a peristaltic pump as degassing pump 311. Preferably, a tube of the peristaltic pump is stiff enough for generating a negative pressure of at least 1 bar, preferably more than 1 bar. However, the degassing pump 311 may also be configured as another pump-type being operable as vacuum pump.

In the degasser 100 of FIG. 5, the peristaltic pump may be operated with a velocity which is larger than the transmission capability of the restrictor 120 at a pressure of 1 bar. As a result, a mixture of vacuum or vapor bubbles and the solvent or liquid 121 to be degassed is generated upstream of the degassing pump 311. The dissolved gas can thus be removed out of the liquid 121 or solvent. The mixture is transported through the degassing pump 311 and is separated in gas separator 128 into a substantially gas-free flow and into another gas bubble containing flow.

As shown, filter 116 can be placed upstream of the gas separator 128 and upstream of consumer unit 106 (which can be embodied as HPLC pump 20). This has the advantage that the gas bubbles are not accumulated in filter 116. Filter 116 can thus be embodied as inline filter. Alternatively, filter 116 can also be integrated in gas separator 128.

The circulation path 114 comprises a conduit 301 accomplishing a return of the degassed solvent. Another conduit 303 carries the solvent with gas which is returned into the liquid container 110.

In another embodiment of the described principle, a negative pressure for solvent degassing can be generated by a serial connection of two or more flow defining pump elements.

In the embodiment according to FIG. 5, the degassing pump 311 should generate a higher aspirating flow than the restrictor 120 can lead through at a pressure difference of 1 bar. Under such circumstances it may be advantageous to adjust the restrictor 120 depending on the viscosity of the solvent.

It may however also be possible to substitute the restrictor 120 by a flow defining pumping element. For instance, two peristaltic pumps can be connected in series, wherein the downstream pump aspirates a higher flow than the one delivered by the upstream pump. As a result, a negative pressure is created upstream of and in the downstream pump. The solvent may degas at this negative pressure.

It is also possible that the flow defining pump element is a peristaltic pump with two pump circuits. This can be embodied, for instance, as two tubes with different inner diameters. The pump circuits may be connected in series, wherein the downstream tube may aspirate a higher flow than the upstream tube.

In yet another embodiment, the flow defining pump element may be a peristaltic pump in which a number of rolls per length is different (preferably at an inlet side and at an outlet side). For instance, this can be accomplished by providing the axes of several rolls radially movable. Such rolls may be arranged so as to not squeeze the tube at an outlet side. It is also possible to accomplish this by configuring the rolls and the tube non-cylindrically, but for instance conically. For instance, a larger radius may be located at the outlet side rather than at the inlet side. As a consequence, the linear velocity of the rolls and the length of the transport segments may be larger at an outlet side. Along the tube in the pump, a negative pressure may be created.

In still another embodiment, the flow defining pump element may be a peristaltic pump in which the tube is squeezed stronger at the inlet side than at the outlet side. As a result, the aspirated flow may be smaller than the possible outlet flow. Along the tube in the pump, a negative pressure may be created. It is also possible that the tube at the inlet side is located substantially or completely orthogonal with regard to the main axis of the pump, but in an oblique way at the outlet side. As a result, the length and the volume of the tube segments increase (in particular incrementally) along the transport direction of the peristaltic pump. As a result, a negative pressure within the peristaltic tube segments is generated. In still another embodiment, the tube may have a cross-sectional area which increases towards the outlet.

In particular, the following embodiments are disclosed:

Aspect 1: Degasser (100) for at least partially degassing a gas-containing liquid (121), in particular for a sample separation device (10), wherein the degasser (100) comprises:

a drive unit (102) configured for circulating the liquid between:

a liquid accommodation volume (104) on the one hand, and an inlet (177) to a consumer unit (106) consuming degassed liquid or a conduit (119) leading to an inlet (177) to a consumer unit (106) consuming degassed liquid on the other hand; and a degassing unit (108) for at least partially degassing the gas-containing liquid (121), in particular in the liquid accommodation volume (104).

Aspect 2: Degasser (100) according to aspect 1, comprising at least one of the following features:

wherein the consumer unit (106) is located vertically higher than the liquid accommodation volume (104);

the degasser is configured so that vapor originating from the gas-containing liquid (121) essentially remains within the fluidic system, in particular within the degasser (100);

the degasser is configured so that vapor originating from the gas-containing liquid (121) is completely or essentially returned into the liquid accommodation volume (104);

the drive unit (102) is configured for driving the liquid via a flow path comprising the degassing unit (108) and a flow path bifurcation, wherein one partial flow after the bifurcation is to be consumed by the consumer unit (106), and another partial flow is to be returned to the liquid accommodation volume (104);

wherein the degassing unit (108) comprises at least one of a group consisting of an ultrasonic degassing unit, a vibration generating degassing unit, and a vacuum generating degassing unit;

the degasser comprises a liquid container (110) containing the degassing unit (108) and the liquid accommodation volume (104);

the degasser comprises an acoustic flow generator (112), in particular an acoustic flow generating nozzle, for generating a directed liquid flow in the liquid accommodation volume (104);

the consumer unit (106) forms part of or is identical with the drive unit (102);

wherein the drive unit (102) is part of the degassing unit (108).

Aspect 3: Degasser (100) according to aspect 1 or 2, comprising a system of conduits defining a circulation path (114) along which the liquid can be circulated between the liquid accommodation volume (104) and the consumer unit (106).

Aspect 4: Degasser (100) according to aspect 3, comprising at least one of the following features:

wherein an inlet and an outlet of the circulation path (114) in the liquid accommodation volume (104) are located substantially at the same height level;

comprising a filter (116) in the circulation path (114).

Aspect 5: Degasser (100) according to any of aspects 1 to 4, comprising at least one of the following features:

comprising a circulation path (114) along which the liquid can be circulated from the liquid accommodation volume (104), in particular via a chamber (118), to the inlet of the consumer unit (106) and back from the inlet (177) of the consumer unit (106) to the liquid accommodation volume (104), in particular without passing through the consumer unit (106);

comprising a circulation path (114) along which the liquid can be circulated between the liquid accommodation volume (104) and the inlet (177) of the consumer unit (106) but excluding the consumer unit (106);

comprising a circulation path (114) along which the liquid can be circulated between the liquid accommodation volume (104) and the inlet of the consumer unit (106), wherein the circulation path (114) does not extend through the consumer unit (106);

wherein the degasser (100) is configured for splitting the at least partially degassed liquid (121) at a splitting point upstream of or at the inlet (177) of the consumer unit (106) to thereby form a first partial flow of the at least partially degassed liquid (121) out of the degasser (100) and into the consumer unit (106) and a second partial flow of the at least partially degassed liquid (121) back to the liquid accommodation volume (104).

comprising a circulation path (114) along which liquid can be circulated so that components of the liquid removed from the liquid are also circulated back to the liquid accommodation volume (104).

Aspect 6: Degasser (100) according to any of aspects 1 to 5, comprising a liquid container (110) provided separately from, in particular at a lower height level than, the liquid accommodation volume (104), wherein the drive unit (102) is configured for circulating liquid between the consumer unit (106), the liquid container (110) and the liquid accommodation volume (104).

Aspect 7: Degasser (100) according to any of aspects 1 to 6, comprising a chamber (118) defining the liquid accommodation volume (104).

Aspect 8: Degasser (100) according to aspect 7, comprising at least one of an inlet restrictor (120) in a flow path from the liquid container (110) to the chamber (118), and an outlet restrictor (122) in a flow path from the chamber (118) to the liquid container (110).

Aspect 9: Degasser (100) according to aspect 8, wherein at least one of the inlet restrictor (120) and the outlet restrictor (122) is selected from a group consisting of a passive restrictor, and an expansion nozzle.

Aspect 10: Degasser (100) according to any of aspects 1 to 9, wherein the degassing unit (108) comprises a movable member (124), in particular a reciprocating member, configured for degassing the gas-containing liquid (121) by moving, in particular by reciprocating, in a chamber (118).

Aspect 11: Degasser (100) according to aspect 10, comprising at least one of the following features:

wherein the movable member (124) forms part of the drive unit (102);

the degasser has a gap (126) between the movable member (124) and the chamber (118) for supplying gas-containing liquid (121) to the chamber (118) via the gap (126);

wherein the movable member (124) in the chamber (118) forms part of one of the group consisting of a piston pump, a syringe pump, and a membrane pump.

Aspect 12: Degasser (100) according to any of aspects 6 to 11, wherein a circulation path (114), within which the liquid is circulated, is split between the degassing unit (108) on the one hand and the consumer unit (106) and the liquid container (110) on the other hand.

Aspect 13: Degasser (100) according to aspect 12, comprising a gas separator (128) at a split point (165) where the circulation path (114) is split, wherein the gas separator (128) is configured for providing degassed liquid to the consumer unit (106) and separated gas to the liquid container (110).

Aspect 14: Degasser (100) according to any of aspects 1 to 13, wherein the consumer unit (106) is configured for consuming only part of the degassed liquid;

wherein the drive unit (102) is configured for circulating another part of the degassed liquid, which is not consumed by the consumer unit (106), back to the liquid accommodation volume (104).

Aspect 15: Degasser (100) for at least partially degassing a gas-containing liquid (121) for a sample separation device (10), wherein:

the degasser (100) comprises a movable body (124), in particular a movable piston or a movable membrane, configured for at least partially degassing the liquid by generating a negative pressure in the liquid, and the degasser (100) is configured for supplying the at least partially degassed liquid (121) to the sample separation device (10), in particular for creation of a mobile phase.

Aspect 16: Degasser (100) according to aspect 15, configured as a degasser (100) according to any of aspects 1 to 14.

Aspect 17: A sample separation device (10) for separating a fluidic sample, wherein the sample separation device (10) comprises:

a pump (20) for driving a mobile phase and the fluidic sample when injected in the mobile phase;

a sample separation unit (30) for separating the fluidic sample in the mobile phase;

a degasser (100) according to any of aspects 1 to 16 for at least partially degassing a gas-containing liquid (121), wherein the at least partially degassed liquid is supplied for creation of the mobile phase.

Aspect 18: Sample separation device (10) according to aspect 17, further comprising at least one of the following features:

wherein at least part of the drive unit (102) forms at least part of the pump (20);

wherein at least part of the consumer unit (106) forms at least part of the pump (20);

the sample separation device (10) is configured as a chromatography sample separation device, in particular a liquid chromatography sample separation device or a supercritical fluid chromatography sample separation device;

the sample separation device (10) comprises a detector (50) configured to detect separated fractions of the fluidic sample;

the sample separation device (10) comprises a fractioner unit (60) configured to collect separated fractions of the fluidic sample;

the sample separation device (10) comprises an injector (40) configured to inject the fluidic sample in the mobile phase.

Aspect 19: A method of at least partially degassing a gas-containing liquid (121), in particular in a sample separation device (10), wherein the method comprises:

circulating the liquid between a liquid accommodation volume (104) on the one hand and an inlet (177) to a consumer unit (106) consuming degassed liquid or a conduit (119) leading to an inlet (177) to a consumer unit (106) consuming degassed liquid on the other hand; and at least partially degassing the gas-containing liquid (121), in particular in the liquid accommodation volume (104).

Aspect 20: A method of at least partially degassing a gas-containing liquid (121) for a sample separation device (10), wherein the method comprises at least partially degassing the liquid by generating a negative pressure in the liquid by moving a movable body (124), in particular a movable piston or a movable membrane, and supplying the at least partially degassed liquid (121) to the sample separation device (10), in particular for creating a mobile phase.

It should be noted that the term "comprising" does not exclude other elements or features and the term "a" or "an" does not exclude a plurality. Also elements described in association with different embodiments may be combined. It should also be noted that reference signs in the claims shall not be construed as limiting the scope of the claims.

The invention claimed is:

1. A system for at least partially degassing a liquid, the system comprising:
    a consumer unit configured to consume degassed liquid, wherein the degassed liquid is at least a portion of the liquid that has been at least partially degassed; and
    a degasser, comprising:
        a circulation path along which the liquid can be circulated between a liquid accommodation volume and one of an inlet to the consumer unit or a conduit leading to the inlet, the circulation path comprising a splitting point located upstream of or at the inlet of the consumer unit,
        wherein the degasser is configured to split the at least partially degassed liquid at the splitting point to thereby form a first partial flow of the at least partially degassed liquid out of the degasser and into the consumer unit and a second partial flow of the at least partially degassed liquid back to the liquid accommodation volume; and
        a drive unit configured for circulating the liquid in the circulation path,
        wherein the drive unit comprises a movable body configured to at least partially degas the liquid by generating a negative pressure in the liquid.

2. The system according to claim 1, comprising at least one of the following features:
    the consumer unit is located vertically higher than the liquid accommodation volume;
    the degasser is configured so that vapor originating from the liquid remains within the system;
    the degasser is configured so that vapor originating from the liquid is completely returned into the liquid accommodation volume;
    an inlet and an outlet of the circulation path in the liquid accommodation volume are located at the same height level.

3. The system according to claim 1, wherein the circulation path is configured so that components of the liquid removed from the liquid are circulated back to the liquid accommodation volume.

4. The system according to claim 1, wherein:
    the consumer unit is configured to consume only part of the degassed liquid; and
    the drive unit is configured to circulate another part of the degassed liquid, which is not consumed by the consumer unit, back to the liquid accommodation volume.

5. A sample separation device for separating a fluidic sample, the sample separation device comprising:
    a pump for driving a mobile phase;
    a sample separation unit for separating the fluidic sample in the mobile phase; and
    the system according to claim 1, wherein:
    the consumer unit comprises the pump;
    the pump is configured to drive the mobile phase, and the fluidic sample when injected in the mobile phase, toward the sample separation unit; and
    the at least partially degassed liquid is supplied for creation of the mobile phase.

6. The sample separation device according to claim 5, further comprising at least one of the following features:
    at least part of the drive unit forms at least part of the pump;
    at least part of the consumer unit forms at least part of the pump;
    the sample separation device is configured as a chromatography sample separation device;
    the sample separation device comprises a detector configured to detect separated fractions of the fluidic sample;
    the sample separation device comprises a fractioner unit configured to collect separated fractions of the fluidic sample;
    the sample separation device comprises an injector configured to inject the fluidic sample in the mobile phase.

7. The system according to claim 1, comprising a chamber defining the liquid accommodation volume, wherein the movable body moves in the chamber.

8. The system according to claim 7, comprising at least one of the following features:
    the degasser has a gap between the movable body and the chamber for supplying the liquid to the chamber via the gap;

the movable body in the chamber forms part of one selected from the group consisting of: a piston pump; a syringe pump; and a membrane pump.

9. The system according to claim 1, comprising a liquid container separate from the liquid accommodation volume, wherein the drive unit is configured to circulate the liquid between the consumer unit, the liquid container and the liquid accommodation volume.

10. The system according to claim 9, wherein the degasser is configured to direct the second partial flow to the liquid container.

11. The system according to the claim 10, comprising a gas separator at the splitting point, wherein the gas separator is configured to provide degassed liquid to the consumer unit and separated gas to the liquid container.

12. The system according to claim 9, comprising a chamber defining the liquid accommodation volume, wherein the movable body moves in the chamber.

13. The system according to claim 1, wherein the consumer unit is configured to consume the degassed liquid by transporting at least a portion of the degassed liquid to a destination separate from the circulation path.

14. The system according to claim 13, wherein the destination comprises a sample separation unit, and the consumer unit is configured to transport the at least portion of the degassed liquid as a pressurized mobile phase to the sample separation unit.

15. The system according to claim 1, wherein the consumer unit comprises a pump.

16. The system according to claim 1, comprising a filter in the circulation path for filtering particles or debris out of the liquid, wherein the liquid is forced through the filter by the drive unit.

17. The system according to claim 1, comprising an inlet restrictor positioned in the circulation path upstream of the drive unit, wherein the inlet restrictor is configured to contribute to the generating of the negative pressure.

18. A method for at least partially degassing a liquid, the method comprising:
    circulating the liquid in a circulation path between a liquid accommodation volume and an inlet to a consumer unit consuming degassed liquid or a conduit leading to the inlet to the consumer unit;
    at least partially degassing the liquid by generating a negative pressure in the liquid, by operating a movable body of a drive unit; and
    splitting the at least partially degassed liquid at a splitting point located in the circulation path upstream of or at the inlet of the consumer unit, to thereby form a first partial flow of the at least partially degassed liquid out of the degasser and into the consumer unit and a second partial flow of the at least partially degassed liquid back to the liquid accommodation volume.

19. A sample separation device for separating a fluidic sample, the sample separation device comprising:
    a pump for driving a mobile phase;
    a sample separation unit for separating the fluidic sample in the mobile phase; and
    a system for at least partially degassing a liquid, the system comprising:
        a consumer unit configured to consume degassed liquid, wherein the degassed liquid is at least a portion of the liquid that has been at least partially degassed; and
        a degasser, comprising:
            a circulation path along which the liquid can be circulated between a liquid accommodation volume and one of an inlet to the consumer unit or a conduit leading to the inlet, the circulation path comprising a splitting point located upstream of or at the inlet of the consumer unit,
            wherein the degasser is configured to split the at least partially degassed liquid at the splitting point to thereby form a first partial flow of the at least partially degassed liquid out of the degasser and into the consumer unit and a second partial flow of the at least partially degassed liquid back to the liquid accommodation volume; and
            a drive unit configured for circulating the liquid in the circulation path, wherein:
    the drive unit comprises a movable body configured to at least partially degas the liquid by generating a negative pressure in the liquid;
    the consumer unit comprises the pump;
    the pump is configured to drive the mobile phase, and the fluidic sample when injected in the mobile phase, toward the sample separation unit; and
    the at least partially degassed liquid is supplied for creation of the mobile phase.

20. The sample separation device according to claim 19, comprising a filter in the circulation path for filtering particles or debris out of the liquid, wherein the liquid is forced through the filter by the drive unit.

21. The sample separation device according to claim 19, comprising an inlet restrictor positioned in the circulation path upstream of the drive unit, wherein the inlet restrictor is configured to contribute to the generating of the negative pressure.

* * * * *